US012711093B2

(12) United States Patent
Dai et al.

(10) Patent No.: US 12,711,093 B2
(45) Date of Patent: Aug. 18, 2026

(54) METHOD AND APPARATUS WITH PERIPHERAL COMPONENT INTERCONNECT EXPRESS (PCIe) DATA TRANSMISSION

(71) Applicant: SAMSUNG ELECTRONICS CO., LTD., Suwon-si (KR)

(72) Inventors: Yuehua Dai, Xi'an (CN); Qianbin Zhu, Xi'an (CN); Wenqiang Zhou, Xi'an (CN); Yunfeng Gong, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 18/416,093

(22) Filed: Jan. 18, 2024

(65) Prior Publication Data

US 2024/0248869 A1 Jul. 25, 2024

(30) Foreign Application Priority Data

Jan. 19, 2023 (CN) ......................... 202310070869.2
Nov. 20, 2023 (KR) ........................ 10-2023-0161474

(51) Int. Cl.
*G06F 13/42* (2006.01)
*G06F 13/28* (2006.01)

(52) U.S. Cl.
CPC .......... *G06F 13/4282* (2013.01); *G06F 13/28* (2013.01); *G06F 2213/0026* (2013.01)

(58) Field of Classification Search
None
See application file for complete search history.

(56) References Cited

U.S. PATENT DOCUMENTS 7,457,897 B1 11/2008 Lee et al.
8,782,317 B1 7/2014 Du
(Continued)

FOREIGN PATENT DOCUMENTS

CN 107005531 A 8/2017
CN 109800202 A 5/2019
(Continued)

OTHER PUBLICATIONS

Zhang, Liuhang, et al., "P-Socket: Optimizing a Communication Library for a PCIe-Based Intra-Rack Interconnect," Proceedings of the ACM International Conference on Computing Frontiers, 2016, (9 Pages in English).

(Continued)

*Primary Examiner* — Henry Tsai
*Assistant Examiner* — Christopher A Bartels
(74) *Attorney, Agent, or Firm* — NSIP Law

(57) ABSTRACT

A method and apparatus for transmitting data based on peripheral component interconnect express (PCIe) are disclosed. The method includes receiving, at an endpoint (EP), a doorbell (DB) message transmitted from a root complex (RC) via a PCIe connection between the endpoint (EP) and the RC; based on the DB message, transmitting, by polling of a processor of the EP, a read request message to a direct memory access (DMA) controller of the EP; and in response to reception of the read request message by the DMA controller, reading, by the DMA controller, data to be transmitted from a memory of the RC and recording read data into a memory of the EP.

14 Claims, 10 Drawing Sheets

(56) References Cited

U.S. PATENT DOCUMENTS

2005/0108518 A1* 5/2005 Pandya .................. H04L 63/20 713/153
2012/0117610 A1* 5/2012 Pandya .................. H04L 69/12 726/1
2013/0117766 A1* 5/2013 Bax ...................... G06F 9/4401 719/323
2013/0318277 A1* 11/2013 Dalal ..................... H04L 49/70 710/308
2014/0101763 A1* 4/2014 Harlacher ........... H04L 63/1458 711/163
2014/0201416 A1* 7/2014 Dalal .................. G06F 13/1652 710/308
2018/0276534 A1* 9/2018 Henry ................. G06F 9/30076
2019/0171566 A1* 6/2019 Jung ...................... G06F 12/10
2019/0286974 A1* 9/2019 Li ......................... G06N 3/045
2020/0004703 A1* 1/2020 Sankaran ............ G06F 13/1673
2020/0081858 A1* 3/2020 Philmore ............ G06F 13/4027
2020/0151104 A1* 5/2020 Yang ................... G06F 13/4282
2021/0373951 A1* 12/2021 Malladi ............... G06F 12/0868
2022/0014592 A1* 1/2022 Kachare .................. H04L 67/51
2022/0108262 A1* 4/2022 Cella ...................... G05B 17/02
2023/0035420 A1* 2/2023 Sankaran .............. G06F 13/404
2023/0231811 A1* 7/2023 Dalal .................. G06F 13/1605 710/308
2025/0068423 A1* 2/2025 Parra Osorio ........ G06F 9/3851
2025/0147762 A1* 5/2025 Ranganathan ........ G06F 9/3888

FOREIGN PATENT DOCUMENTS

KR 10-1520871 B1 5/2015
KR 10-2017-0133236 A 12/2017

OTHER PUBLICATIONS

"DG0713 Demo Guide RTG4 FPGA PCIe Data Plane Demo using Scatter-Gather DMA Controller," Microsemi, 2021, (31 Pages in English).
"3.2.2.11. PCIe End Point," Texas Instruments, 1995-2023, (14 Pages in English).

* cited by examiner

METHOD AND APPARATUS WITH PERIPHERAL COMPONENT INTERCONNECT EXPRESS (PCIe) DATA TRANSMISSION

CROSS-REFERENCE TO RELATED APPLICATIONS

This application claims the benefit under 35 USC § 119(a) of Chinese Patent Application No. 202310070869.2 filed on Jan. 19, 2023, in the China National Intellectual Property Administration, and Korean Patent Application No. 10-2023-0161474 filed on Nov. 20, 2023, in the Korean Intellectual Property Office, the entire disclosures of which are incorporated herein by reference for all purposes.

BACKGROUND

1. Field

The following embodiments relate to a data transmission technical field, and more particularly, a method and apparatus for transmitting data based on peripheral component interconnect express (PCIe).

2. Description of Related Art

The Peripheral Component Interconnect express (PCIe) standard(s) is a third-generation bus technical specification that may be implemented by devices to provide high bandwidth, low latency, flexible scaling, hot swap support, error processing, and error reporting. Accordingly, PCIe busses are widely used to implement high-speed data transmission between peripheral devices and between a peripheral device and a host.

However, when transmitting data packets with large payloads on a PCIe bus, the transmission bandwidth may be close to an original bandwidth but the transmission latency may be high. When transmitting data packets with small payloads, the transmission bandwidth may be low, the CPU overhead may increase as a response to interrupt signals, and there may be overhead from frequent initialization of a direct memory access (DMA) controller.

Therefore, there is a need to improve the data transmission performance of PCIe based devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a of method peripheral component interconnect express (PCIe) data transmission includes: receiving, at an endpoint (EP), a doorbell (DB) message transmitted from a root complex (RC) via a PCIe connection between the endpoint (EP) and the RC; based on the DB message, transmitting, by polling of a processor of the EP, a read request message to a direct memory access (DMA) controller of the EP; and in response to reception of the read request message by the DMA controller, reading, by the DMA controller, data to be transmitted from a memory of the RC and recording read data into a memory of the EP.

The method may further include: when determined that there is no more of the data to be transmitted from the processor of the EP in the memory of the RC, stopping the polling transmission of the read request message to the DMA controller by the EP processor.

The determining that there is no more of the data to be transmitted from the processor of the EP is based on the read data from the memory of the RC from the processor of the EP including a data terminator.

The method may further include: in response to recording the read data into the memory of the EP from the processor of the EP, recording the read data from the memory of the EP after invalidating data in a first cache of the processor of the EP, wherein the processor of the EP operates in a cacheable mode.

The method may further include: in response to reception of a data transmission request by the processor of the EP, recording the data to be transmitted in a second cache of the processor of the EP; flushing, by the processor of the EP, the data to be transmitted from the second cache to the memory of the EP; and recording the data to be transmitted from the DMA controller from the memory of the EP to the memory of the RC, wherein the processor of the EP operates in a cacheable mode.

The method may further include: after recording the data to be transmitted from the processor of the EP into the second cache, recording a data terminator in the second cache; and inputting the data terminator from the processor of the EP from the second cache to the memory of the EP.

The reading of the data to be transmitted from the memory of the RC and the recording of the read data in the memory of the EP may include: reading a data packet in the memory of the RC in a preset length from the DMA controller.

The method may further include: determining whether a number of data packets read from the processor of the EP is an integer multiple of a preset number; when the number of data packets read from the processor of the EP is the integer multiple of the preset number, determining whether the preset length is greater than a length of a data packet having a greatest length among the preset number of data packets which are recently read; and when the preset length is determined that the preset length is greater than a length of the data packet having the greatest length among the preset number of data packets read from the processor the EP, updating the preset length to the greatest length.

The method may further include: determining whether a number of data packets read from the processor of the EP is an integer multiple of a preset number; when a number of data packets read from the processor of the EP is not the integer multiple of the preset number, determining whether a length of the data packet is greater than the preset length based on data of the read data packet; when the length of the data packet is determined that the length of the data packet is greater than the preset length in the processor of the EP, updating the preset length to the length of the data packet; and when the length of the data packet is determined that the length of the data packet is greater than the preset length in the DMA controller, reading the data packet again in the length of the data packet.

In another general aspect, a method of peripheral component interconnect express (PCIe) data transmission includes: receiving a PCIe message signaled interrupts (MSI) message transmitted by an endpoint (EP) via a PCIe connection to a root complex (RC); and reading data in a memory of the RC from a processor of the RC by polling performed by the processor of the RC, wherein the data in the memory of the RC is recorded by a direct memory access (DMA) controller of the EP.

The method may further include: when determined that the data does not exist in the memory of the RC, stopping polling that causes the reading the data.

The method may further include: in response to reading data of the memory of the RC from the processor of the RC by the polling, recording read data in a third cache after invalidating data in the third cache of the processor of the RC, wherein the processor of the RC operates in a cacheable mode.

The method may further include: in response to reception of a data transmission request from the processor of the RC, recording data to be transmitted into a fourth cache of the processor of the RC; flushing the data to be transmitted from the processor of the RC from the fourth cache to the memory of the RC; and transmitting a doorbell (DB) message from the processor of the RC to the EP, wherein the processor of the RC operates in a cacheable mode.

The method may further include: after recording the data to be transmitted from the processor of the RC into the fourth cache, recording a data terminator in the fourth cache and flushing the data terminator from the fourth cache to the memory of the RC.

The method may further include: when a terminator is included in data read from the memory of the RC in the processor of the RC, determining that the data to be transmitted does not exist in the memory of the RC.

A non-transitory computer-readable storage medium may store instructions that, when executed by a processor, cause the processor to perform any of the methods.

In another general aspect, an endpoint (EP) includes: an interface configured to receive a doorbell (DB) message from a root complex (RC) connected to the EP based on peripheral component interconnect express (PCIe); a processor configured to transmit a read request message to a direct memory access (DMA) controller of the EP by polling; and the DMA controller configured to read data to be transmitted from a memory of the RC in response to reception of the read request message, and record read data in a memory of the EP.

The processor may be further configured to: when the data to be transmitted is determined that the data to be transmitted does not exist in the memory of the RC, stop transmission of the read request message to the DMA controller.

In another general aspect, a root complex (RC) includes: an interface configured to receive a peripheral component interconnect express (PCIe) message signaled interrupts (MSI) message transmitted by an endpoint (EP) via a PCIe connection; and a processor configured to read data in a memory of the RC by polling, wherein the data in the memory of the RC is recorded by a direct memory access (DMA) controller of the EP based on the polling.

The processor may be further configured to: when determined that the data does not exist in the memory of the RC, stop the polling.

Other features and aspects will be apparent from the following detailed description, the drawings, and the claims.

DETAILED DESCRIPTION

Figure 1:
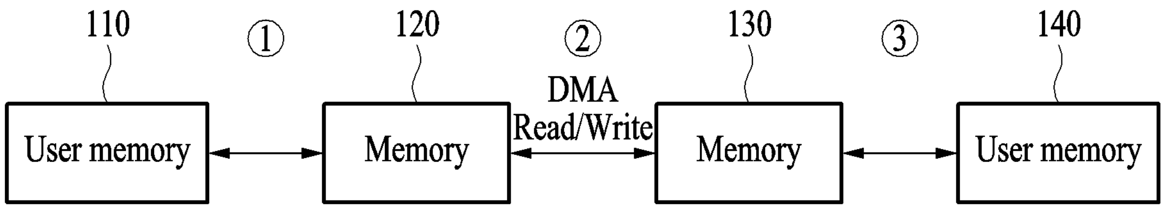
FIG. 1 shows an example of data transmission based on peripheral component interconnect express (PCIe), according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between"

and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

The purpose of the present disclosure is to provide a method and apparatus for transmitting data based on peripheral component interconnect express (PCIe) to improve the performance of data transmission while reducing the implementation cost. The method and apparatus improve the data transmission performance based on PCIe by notifying a direct memory access (DMA) controller to read data from a memory of a root complex (RC) by polling and determining whether data recorded by the DMA controller exists in the memory of the RC.

Hereinafter, methods and apparatuses for transmitting data based on peripheral component interconnect express (PCIe) are described with reference to FIGS. 1 to 10.

FIG. 1 shows an example of data transmission based on peripheral component interconnect express (PCIe), according to one or more embodiments.

Referring to FIG. 1, as indicated by circled numbers "1", "2", and "3", data copying may be performed three times in the process of transmitting data from one end to another end based on PCIe connection. The three data copies are described next. In places where operations of a sending or receiving processor are described, such description may also apply to operations of a PCIe controller.

(1) First data copy: A processor of a transmission end (e.g., a root complex (RC) end) may copy data from a user memory 110 of the transmission end to a memory 120 of the transmission end and may do so through an interface module of a PCIe software stack. The memory 120 of the transmission end may be, for example, memory of a processor or PCIe controller of the transmission end.

(2) Second data copy: A processor of the reception end (e.g., an endpoint (EP) end) may copy data from the memory 120 of the transmission end to a memory 130 of the reception end through a direct memory access (DMA) controller. The memory 130 of the reception end may be memory of the processor or a PCIe controller of the reception end.

(3) Third data copy: The processor of the reception end (e.g., the EP end) may copy data from the memory 130 of the reception end to the user memory 140 of the reception end through the interface module of the PCIe software stack.

When transmitting data based on PCIe as described with reference to FIG. 3, since cache of the sending/receiving processor/controller is not usually synchronized with data of its corresponding memory (on the same end as the processor/controller), when the sending or receiving processor/controller operates in a non-cacheable mode, data is not generally copied to/from the cache of the processor (or PCIe controller) to the memory thereof, and the data is generally copied only in the unit of bytes from the user memory (e.g., memory 110) to the memory of the processor. Therefore, an actual data transmission bandwidth may be significantly lower than a PCIe transmission bandwidth capacity.

In addition, problems may occur in some scenarios. When transmitting data from the RC end to the EP end, there may be no DMA controller in the RC end, i.e., there may be a DMA controller only exist in the EP end. The RC end may transmit an in-band doorbell (DB) message (or DB interrupt) to the EP end through a message module of the PCIe software stack (of the RC end), thus triggering an interrupt at the EP end. The DB message may be a PCIe message, e.g., a message signaled interrupt (MSI) message. The EP may receive the DB message (as transmitted by the message module of the PCIe stack of the RC end) and in response may notify its DMA controller to perform a read operation. In response to being notified of the read operation, the DMA controller may read data from the PCIe controller memory of the RC end (e.g., memory 120) to the memory of the PCIe controller of the EP end (e.g., memory 130). Since a DB message needs to be transmitted to the EP end when transmitting data from the RC end, the following problems may occur.

In some implementations, a location of where the data is to be read from (e.g., a memory location) may be read from the RC end, possibly predefined, e.g., in the interrupt hander, or may be read from a register. When the EP receives a DB message from the RC, the EP may notify its DMA controller to read data from the predefined memory address of the memory of the RC. Alternatively, the information of where to read the data from may be read from the RC end from within the DB message.

(1) The DB message may be lost, and since in this case the EP does not receive the DB message, its DMA controller may not read data in the memory of the RC, hence the data may be lost.

(2) When there are many DB messages/interrupts, the EP processor must respond with frequent context conversions (context switches) which may significantly increase overhead of the EP processor.

Similarly, when transmitting a message signaled interrupt (MSI) message from the EP end to the RC end, the same problem may frequently occur; the MSI message or a response thereto may be omitted.

Some implementations of methods and apparatuses described herein for PCIe-based data transmission may prevent or reduce data loss (or other errors) that stem from the loss of a DB message and/or an MSI message, and may improve the reliability of data transmission while improving the data transmission speed.

The RC and the EP described herein are two respective electronic devices having a PCIe connection; the RC represents an electronic device not having a DMA controller and the EP represents another electronic device having a DMA controller.

In addition, the RC described herein may include a processor (or a PCIe controller), a cache (cache of the processor or cache of the PCIe controller), and a memory (a memory of the PCIe controller or a memory of the processor). Similarly, the EP may include a processor (or the PCIe controller), a cache (cache of the processor or cache of the PCIe controller), a memory (a memory of the PCIe controller or a memory of the processor), and a DMA controller.

When the RC transmits user data to the EP, the RC needs to record the data to be transmitted in the memory of the RC (e.g., memory 120), and when receiving data from the EP, the is recorded/copied from the memory of the EP into the memory of the RC by the DMA controller of the EP. In addition, the memory of the RC used for transmitting data and the memory of the RC used for receiving data may be different memories, the same memory, or different areas in the same RC memory.

When the EP transmits data to the RC, the EP may record the data to be transmitted in the memory of the EP (e.g., memory 130). When receiving data from the RC, the data in the memory of the RC may be read and written into the memory of the EP (e.g., memory 130) by the DMA controller. The memory of the EP used for transmitting data and the memory of the EP used for receiving data may be different memories, the same memory, or different areas in the same EP memory.

The cache of the RC used for transmitting data and the cache of the RC used for receiving data may be different caches of the RC, the same cache, or different areas in the same cache.

Figure 2:
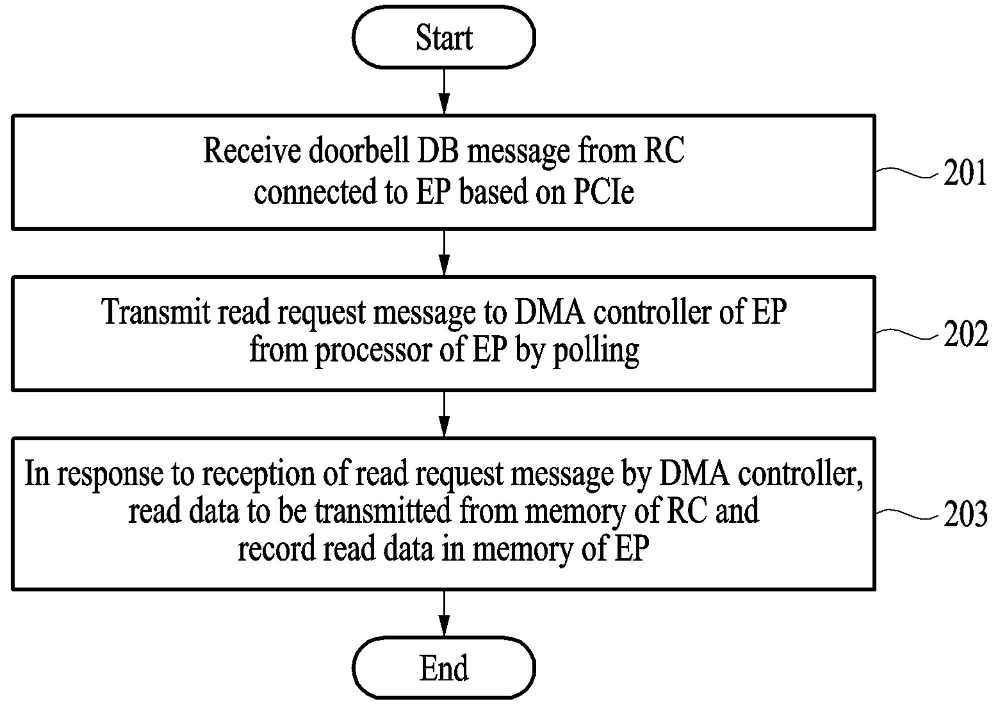
FIG. 2 shows a PCIe-based data transmission method according to one or more embodiments.

FIG. 2 shows a PCIe-based data transmission method, according to one or more embodiments.

Referring to FIG. 2, in operation 201, a data transmission method may include an EP receiving a doorbell (DB) message from an RC that is connected to the EP based on PCIe.

In operation 202, based on the DB message, the data transmission method may include transmitting a read request message to a DMA controller of the EP from the processor of the EP by polling performed by the EP (e.g., a processor of the EP) at a predetermined interval. For example, the processor of the EP may transmit the read request message to the DMA controller by polling through (performed by) a message module of a PCIe software stack of the EP processor.

In addition, in operation 203, in response to the read request message being received by the DMA controller (as sent by the polling action of the EP processor's PCIe message module), the data transmission method may include the DMA controller reading the data to be transmitted from the RC and the EP may record the read data. To that end, the memory of the RC may store, into the EP end, data to be read by the DMA controller of the EP, i.e., the DMA controller may read data from the RC memory (e.g., memory 120) to EP memory (e.g., memory 130).

In some embodiments, when the DB message is received by the processor of the EP, the processor of the EP may begin polling and may thereby notify the DMA controller to read (and continue reading, according to the polling) the data from the memory of the RC. Thus, even if the DB message becomes lost, the data transmission method may prevent data loss because data corresponding to the lost DB message is nonetheless read by the DMA controller. In addition, the data transmission method may prevent frequent initialization of the DMA controller because the DMA controller is polled to read data from the memory of the RC end. In addition, the data transmission method may reduce processor overhead and occupancy due to frequent interrupt context switching and may reduce a data transmission delay because the processor polls the DMA controller to read data from the memory of the RC, and even if the processor does not respond to (or receive) a subsequent DB message, the DMA controller also, due to being polled, reads data corresponding to the subsequent DB message. For example, when the data transmission method determines that data to be transmitted no longer exists in the method of the RC (described below), the processor of the EP may stop the polling-transmission of the read request message to the DMA controller.

Regarding the potential loss of a DB message, consider that when a DMA controller of the EP reads data from the memory of the RC, it may read a block (for example) that includes data-1, data-2, . . . , data-n. When the EP receives a DB message corresponding data 2, the DMA controller still reads the block including data-1, data-2, . . . , data-n. Therefore, even if a DB message corresponding data-1 or data-3 is lost during the communication, data-1 and data-3 are still read by the DMA controller. When the EP finds that there is no data to be read in the memory of RC (since all the data of the block has already been read by the DMA controller), the EP may stop the DMA controller from reading the data from the EP. Since data-3, . . . data-n are already read, the EP does not have to respond/acknowledge to a DB message corresponding to data-3, . . . data-n.

Regarding the stopping of the polling, for example, when the data read from the memory of the RC includes a data terminator, the processor of the EP may determine that the data to be transmitted no longer exists in the memory of the RC. In some examples, the terminator may be detected by the EP processor when the EP processor is copying the data from the EP memory (e.g., memory 130) to the user memory (e.g., memory 140).

According to one embodiment of the present disclosure, because the data to be transmitted no longer exists in the memory of the RC when the data terminator is read from the memory of the RC, the processor of the EP may stop polling-transmission of the read request message to the DMA controller and thus unnecessary polling (transmitting the read request message) may be prevented.

For example, the processor of the EP may operate in a cacheable mode and in response to the data being recorded in memory 140, wherein the data is read from the processor of the EP to the memory of the EP, the data transmission method may invalidate data in the first cache of the processor of the EP, and then, may record the data read from the memory of the EP in the first cache.

In response to the reception of a data transmission request by the processor of the EP, the processor of the EP may record the data to be transmitted to the second cache of the processor of the EP. In addition, the processor of the EP may flush the data to be transmitted from the second cache to the memory of the EP. Furthermore, the DMA controller may record the data to be transmitted in the memory of the RC from the memory of the EP.

When the processor of the EP operates in the cacheable mode, when data exists in the memory of the EP, the processor of the EP may copy the data in the memory of the EP to the cache of the EP in the unit of cache operations. In addition, when the processor of the EP invalidates data in the cache of the EP (before writing data in the memory of the EP into the cache of the EP), the processor of the EP may ensure that the data obtained from the cache of the EP is the latest data from the memory of the EP. In addition, when transmitting the data, if the processor of the EP inputs the data in the second cache of the processor of the EP to the memory of the EP, the processor of the EP may ensure that the data in the second cache is recorded in the memory of the RC. The first cache and the second cache may be different caches of the EP, different areas in the same cache, or the same cache.

Figure 3:
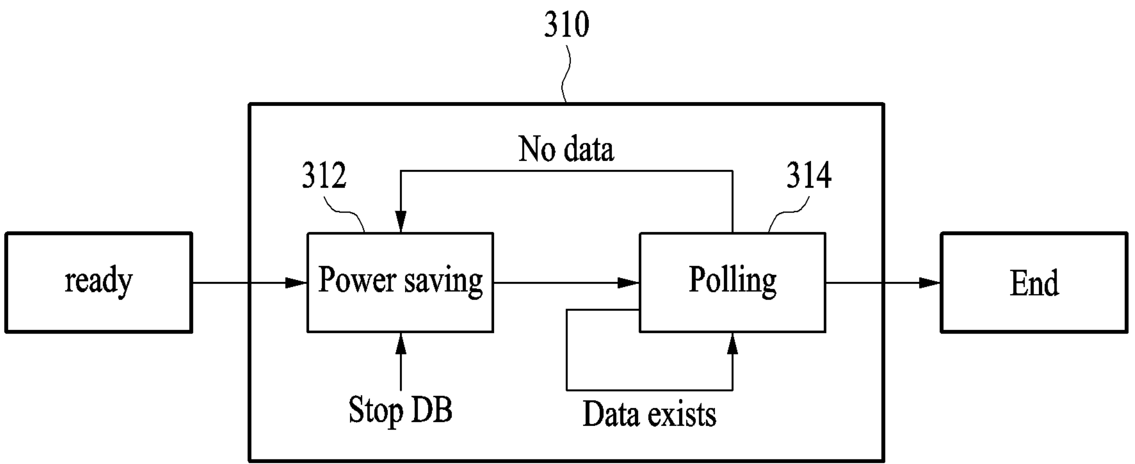
FIG. 3 shows an example of a change in a state of a message module of an endpoint, according to one or more embodiments.

FIG. 3 shows an example of a change in a state of a message module of an endpoint (EP), according to one or more embodiments. A message module 310 of the EP may be in a PCIe software stack of the EP (as discussed above).

Referring to FIG. 3, when a DB interrupt/message is received by the EP (e.g., EP processor or controller), the message module 310 of the EP may transition from a power saving state 312 (with no polling) to a polling state 314. When it is determined that data still exists in a corresponding memory of an RC, the message module 310 of the EP may continue its polling loop. When it is determined that data does not exist in the memory of the RC, the message module 310 may transition back to the power saving state 312. the noted data in the memory of the RC is data that needs to be transmitted from the RC to the EP.

For example, after recording the data to be transmitted into the second cache of the processor of the EP, the processor of the EP may record a data terminator in the second cache of the processor of the EP and may enter the data terminator into the memory of the EP from the second cache.

By the RC recording the data terminator in the memory of the RC, the processor of the EP may determine that there is no more data in the memory of the RC to transfer, and based on this determination, the EP processor may stop reading from the memory of the RC. In other words, when the RC provides a data terminator, that serves to stop the EP processor's reading of the data.

For example, the data transmission method may include being able to receive read request messages and/or a write request messages by the DMA controller and may include responding to the read request messages and/or the write request messages according to the order of the time of receipt thereof(e.g., in first-in-first-out order) (here, a read request refers to a message for transferring data from the RP to the EP, and a write request refers to a message for transferring data from the EP to the RP). A read request message may be transmitted by the processor of the EP to the DMA controller to instruct the DMA controller to read the data to be read in the memory of the RC into the memory of the EP. Before, at the same time, or after, a write request message may be transmitted by the processor of the EP to the DMA controller to instruct the DMA controller to record the data to be transmitted to the memory of the EP into the memory of the RC.

When there is a DMA controller only in the EP end (not in the RP end), the DMA controller may need to respond to not only the read request messages but also the write request messages, the DMA controller may respond to such messages based on the times (or order) of receipt of the messages, and the DMA controller may perform a read operation or a write operation (corresponding to the received message) to reasonably allocate a bandwidth when transmitting data from both ends to each other.

For example, to be able to respond to read request messages and write request messages based on the times of receipt thereof, the DMA controller may compare (i) the time of receipt of a write request message that is the earliest among received write request messages with (ii) the time of receipt of a read request message that is the earliest among the received read request messages. When the time of receipt of the earliest write request message is different from the time of receipt of the earliest read request message, the DMA controller may respond to the message (earliest read or earliest write) having the earlier time of receipt and may delete the other message; when neither is earlier (they have the same time) the DMA controller may arbitrarily or randomly respond to one and then the other.

In some embodiments, the DMA controller may respond to a read request message or a write request message having an earliest time of receipt between them, and when the time of receipt of an earliest read request message is the same as the time of receipt of the earliest write request message, the fairness of data transmission may be ensured by responding to the two messages in a random order. When a read request message having the earliest time of receipt and an earliest write request message have the same time of receipt, it is possible to determine in advance which of the messages to respond to first.

Figure 4:
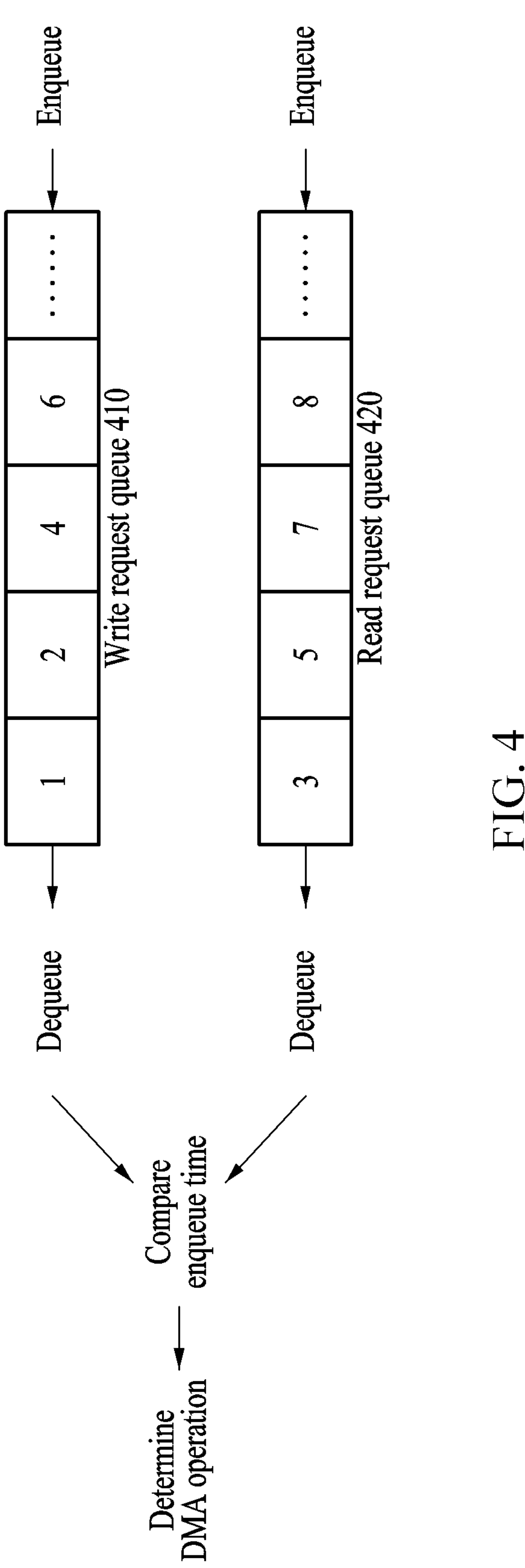
FIG. 4 shows an example of a direct memory access (DMA) controller responding to read and write request messages in order of the receipt thereof, according to one or more embodiments.

FIG. 4 shows an example of a DMA controller responding to read request messages and/or write requests message in the order of receipt thereof, according to one or more embodiments.

Referring to FIG. 4, write request messages and read request messages may be managed by using two respective unlocked message queues managed by the DMA controller. Read/write messages received by the DMA controller are enqueued into the corresponding queues. A write request queue 410 includes write request messages transmitted by the processor of the EP to the DMA controller to instruct the DMA controller to record the data to be transmitted from the memory of the EP into the memory of the RC. A read request queue 420 holds read request messages transmitted by the processor of the EP to the DMA controller to instruct the DMA controller to read the data to be transmitted from the memory of the RC into the memory of the EP. The DMA controller may compare the time of receipt of an earliest/first write request message (in the write request queue 410) and the time of receipt of an earliest/first read request message (in the read request queue 420), and when the earliest time of receipt of the earliest/first write request message is different from the earliest time of receipt of the earliest/first read request message, the DMA controller may respond to whichever message has the earliest time of receipt and may delete the message from the queue (the messaging having been handled/responded to). In addition, the DMA controller may arbitrarily respond to one of the earliest write request message and the earliest read request message and then may respond to the other when their receipt times are the same.

When the earliest time of receipt of an earliest read request message is different from the time of receipt of an earliest/first write request message, a processor may execute whichever of the messages has an earlier time of receipt, and may delete (dequeue) a corresponding message. The processor may then compare a remaining (new earliest/first) read request message with the earliest/first write request message, and when the earliest time of receipt of the read request message is the same as the time of receipt of the write request message, the processor may randomly and sequentially execute the two messages and then may delete the two messages. This process may be iteratively performed on the remaining read request messages and the write request messages. For example, for a first write request message in the write request message queue (at the head of the queue) and a first read request message in a read request message queue(at the head of the queue), when the time of receipt of the first write request message is earlier than the time of receipt of the first read request message, the DMA controller may write data in the memory of the EP to the memory of the RC in response to the first write request message. Thereafter, the first write request message may be deleted. Next, the processor may compare the time of receipt of the first read request message in the updated queue with the time of receipt of the first write request message (the first write request message is a second write request message before the queue is updated), and may determine to which message to respond based on the time of receipt of the first read request message in the updated queue and a second write request message. In other words, the processor continues to dequeue and execute whichever first/earliest message, among the queues, is earliest, regardless of which queue the earliest message is in.

The DMA controller may manage the read request message and the write request message by executing a bandwidth allocation management module in the software stack.

The data to be transmitted may be recorded in the cache of the EP and the memory in the form of a data packet, for example.

Figure 5:
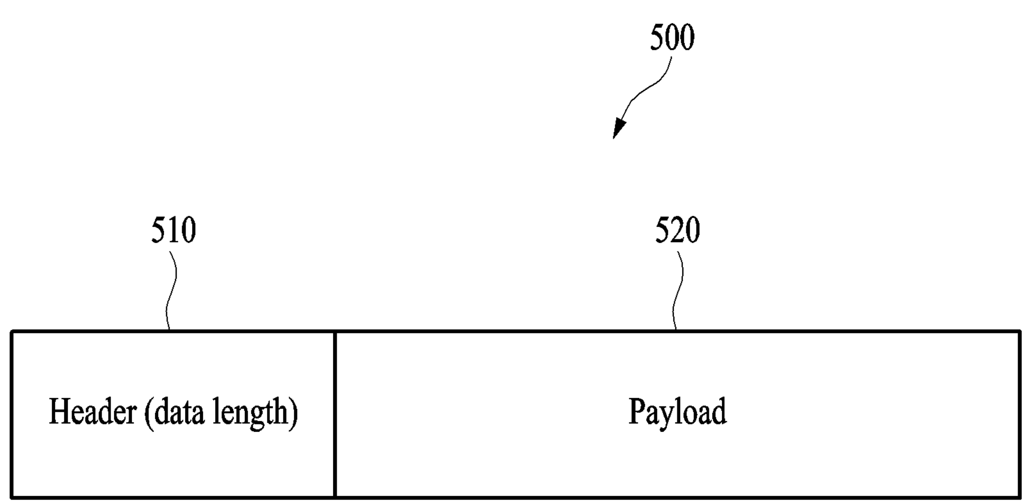
FIG. 5 shows a data packet structure, according to one or more embodiments.

FIG. 5 is an example of a data packet structure according to one or more embodiments.

Referring to FIG. 5, a data packet 500 may include a packet header 510 and a payload 520. In this case, the header 510 may include a field indicating the data length of the payload 520 (in other words, a length of the data packet).

For example, after the data to be transmitted is recorded in the memory of the EP in the form of the data packet 500 through the cache of the EP, the data packet 500, of which the payload 520 is, by convention, a terminator, may be recorded in the memory of the EP in the form of the data packet 500 through the cache of the EP, and after the data to be transmitted is transmitted to the memory of the RC by the DMA controller, the data packet 500, of which the payload 520 is a terminator, may be transmitted to the memory of the RC.

For example, when the data to be transmitted exists in the EP, in the EP end, a PCIe_read interface may be called and the data may be capsulated in the data packet 500 in the form of the "packet header 510 (data length)+payload 520" and may be transmitted to the EP memory, while a PCIe message module of the EP end may be notified in the form of a signal quantity. When data to be transmitted to the RC does not exist (there is no more data to transmit), one data terminator may be recorded at the beginning of the EP memory. When the message module senses that the data to be transmitted exists in the memory of the EP, the message module may notify the DMA controller to perform a write operation to record the data in the memory of the EP in the memory of the RC.

When data of one data packet in the memory of the EP is recorded in the memory of the RC by the DMA controller, the EP transmits an MSI message to the RC to notify the RC to read the data from the memory of the RC.

For example, when it is determined that the data exists in the memory of the EP, a PCIe_write interface may be called and the data may be transmitted to the user. In addition, before the data is transmitted to the user by calling the PCIe_write interface, an invalidation operation on the EP cache may be performed to ensure that the data read by the user from the EP end is the same as the data in the EP memory.

Reading data from the memory of the RC by/in the DMA controller may include reading a data packet in the memory of the RC at a preset length.

The processor of the EP may determine whether the number of read data packets is an integer multiple of a predetermined number, and when the number of read data packets is the integer multiple of the predetermined number, the processor of the EP may determine whether the preset length is greater than a length of a data packet having the greatest length among the predetermined number of recently read data packets. When the preset length is greater than the length of the data packet having the greatest length among the predetermined number of the recently read data packets, the processor of the EP may update the preset length to the greatest length.

Conversely, when the number of read data packets is not an integer multiple of the predetermined value, the processor of the EP may determine whether the length of the data packet is greater than the preset length based on the data of the read data packet. When it is determined that the length of the data packet is greater than the preset length, the processor of the EP may update the preset length to the length of the data packet. In this case, when the processor of the EP determines that the length of the data packet is greater than the preset length, the DMA controller may read the data packet again at the length of the data packet. In this case, the number of read data packets may consider a data packet that is currently read or may not consider the data packet that is currently read. For example, when a read data packet is a 99th data packet, the number of read data packet may be 99 or 98.

In a conventional method, when the DMA controller reads data from the memory of the RC, since the length of a data packet to be transmitted from the memory of the RC is unclear, the DMA controller may read data based on a maximum data packet length in general. For example, the memory of the RC may be divided into blocks of 65535 bytes (in other words, a maximum length of a data packet is 65535 bytes), and in this case, the DMA controller may read a data packet in the unit of 65535 bytes from the memory of the RC. However, when a length of a data packet in the memory of the RC is significantly less than 65535 bytes, reading a data packet in the unit of 65535 bytes in the memory may cause a waste of bandwidth.

However, in at least some embodiments described herein, the data packet in the memory of the RC may be read in the length unit less than 65535 bytes and the length of the read data packet may be determined based on the read data. For example, the length of the read data packet may be identified based on read header information (determined based on header information of the read data packet), and when the length of the data packet is greater than the unit length, it may indicate that all pieces of data of the data packet are not read, and, in this case, because the data packet may be read again based on the length of the data packet, all pieces of data included in the data packet may be read.

In addition, since the size of a transmitted data packet may vary over time, the transmission performance of the data may be improved if it is able to dynamically change the length of the unit to a value appropriate for reading the data packet from the memory of the RC.

According to one or more embodiments, the unit length may be updated to determine the data packet from the memory of the RC based on a preset length of a recently obtained data packet. For example, the preset length may be updated by an increment that is greater than a maximum length, and the increment may be a preset value.

Figure 6:
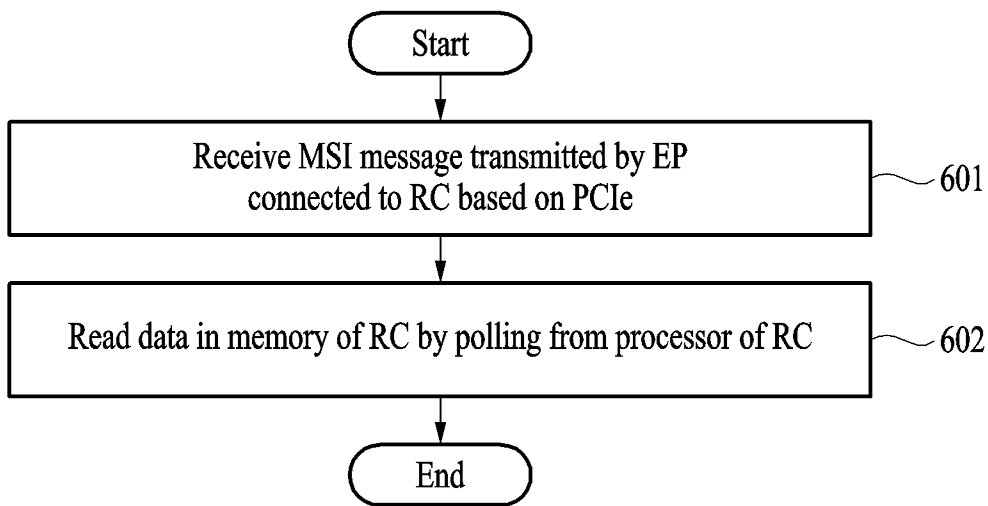
FIG. 6 shows a PCIe-based data transmission method, according to one or more embodiments.

FIG. 6 shows a PCIe-based data transmission method according to one or more embodiments.

Referring to FIG. 6, in operation 601, a data transmission method may receive an MSI message transmitted by an EP connected to an RC based on PCIe.

In addition, in operation 602, the data transmission method may read data in a memory of the RC by polling performed in a processor of the RC. In this case, the data in the memory of the RC may be recorded by a DMA controller of the EP.

According to one or more embodiments, since the processor of the RC reads data from the memory of the RC by polling initiated in response to the MSI message, the data corresponding to the MSI message may be read from the memory of the RC even if the MSI memory is later lost/omitted/overwritten etc. In addition, since the processor determines whether the data exists in the memory of the RC by polling, the processor may not need to frequently respond to a subsequent MSI message, thus, overhead of the processor may be reduced and the data transmission performance may be improved. For example, the processor of the RC may perform the polling operation by executing a message module in a software stack (within which the polling is performed).

Figure 7:
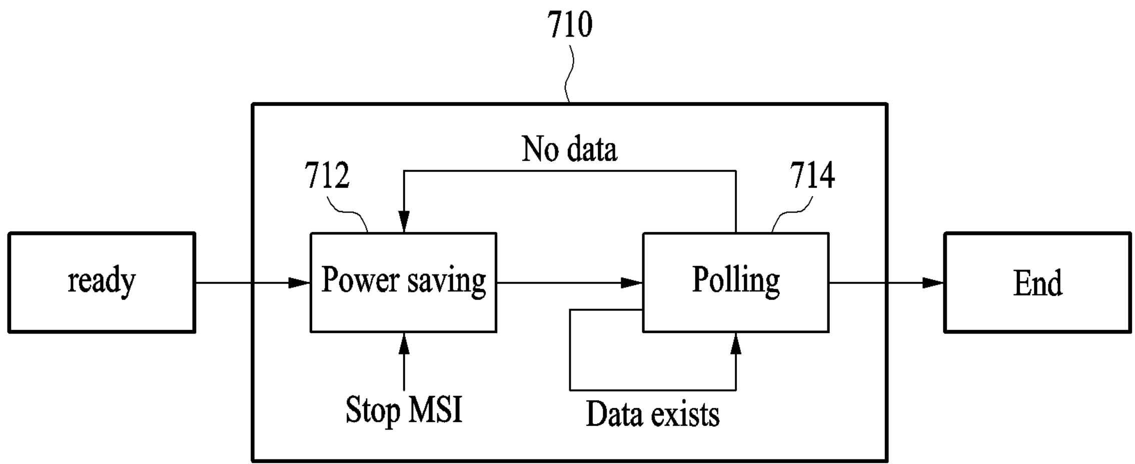
FIG. 7 shows a change in a state of a message module of a root complex, according to one or more embodiments.

FIG. 7 shows an example of a change in a state of a message module of a root complex according to one or more embodiments.

Referring to FIG. 7, when an MSI message is received, a message module 710 may enter a polling state 714 from a power-saving state 712, and when it is determined that data to be read still exists in a memory of the RC, the message module 710 may continue the polling. When it is determined that the data to be read does not exist (there is no more data) in the memory of the RC, the message module 710 may enter the power saving state 712.

For example, when the processor of the RC determines that the data no longer exists (there is no more data) in the memory of the RC, the processor of the RC may stop reading the data by polling (i.e., stops polling).

For example, when the data read from the memory of the RC includes a terminator, based thereon, the processor of the RC may determine that the data no longer exists in the memory of the RC.

According to one or more embodiments, when the data terminator is read from the memory of the RC, it may indicate that the data to be read no longer exists in the memory of the RC, thus the data reading from the memory of the RC may be stopped; through this mechanism, unnecessary polling for reading may be prevented.

For example, the processor of the RC may operate in a cacheable mode and in response to reading data from the memory of the RC by way of the polling action, the processor of the RC may invalidate data in a third cache of the processor of the RC and may record the read data into the third cache.

In response to the reception of the data transmission request, the processor of the RC may record the data to be transmitted in a fourth cache of the processor of the RC, may flush the data to be transmitted from the fourth cache of the processor of the RC to the memory of the RC, and may transmit a doorbell (DB) message to the EP.

According to one or more embodiments, when data in the third cache of the RC is invalidated before writing the data in the memory of the RC to the third cache of the RC, it may be ensured that the data obtained from the third cache of the RC is the latest data from the memory of the RC. In addition, when transmitting the data, if data in the fourth cache of the processor of the RC is input to the memory of the RC, it may ensure that the data in the fourth cache is recorded in the memory of the EP.

For example, after recording the data in the fourth cache of the RC, the processor of the RC may record a data terminator in the fourth cache of the RC and may flush the data terminator from the fourth cache to the memory of the RC.

The third cache and the fourth cache may be different caches of the RC, the same cache, or different areas in the same cache.

According to one or more embodiments, since the data of the fourth cache is transmitted to the memory of the RC, by recording the data terminator in the fourth cache, when the EP's DMA controller/module reads data from the memory of the RC and reads the data terminator, the DMA controller may determine that the data no longer exists in the memory of the RC, and in this case, the DMA controller may stop reading the data from the memory of the RC.

For example, when a message module of the RC end discovers that the data to be read exists (there is still data remaining) based on polling the memory of the RC, the message module may notify a PCIe_write interface through a semaphore. The PCIe_write interface may call kernel_write, which is a read data function, and may send data—of which a header is removed—from the memory of the RC to a user process/memory. The cache of the processor may need to be invalidated before calling the read data function to obtain correct data. This may ensure that the data that the user process retrieves from the cache is the same as the data in the memory of the RC.

For example, when the data to be transmitted exists in the RC end, a user of the RC end may transmit the data to the memory of the RC by calling the PCIe_read interface and may simultaneously notify the message module of the RC end in the form of semaphore. After the RC records the data packet in the memory of the RC, the message module may indicate that the data does not exist (there is no more data to be read) by recording a terminator in the header at a position to be recorded the next time. In some implementations, the terminator may be in the header, and in some other implementations the terminator may be a specific length value in the header.

Figure 8:
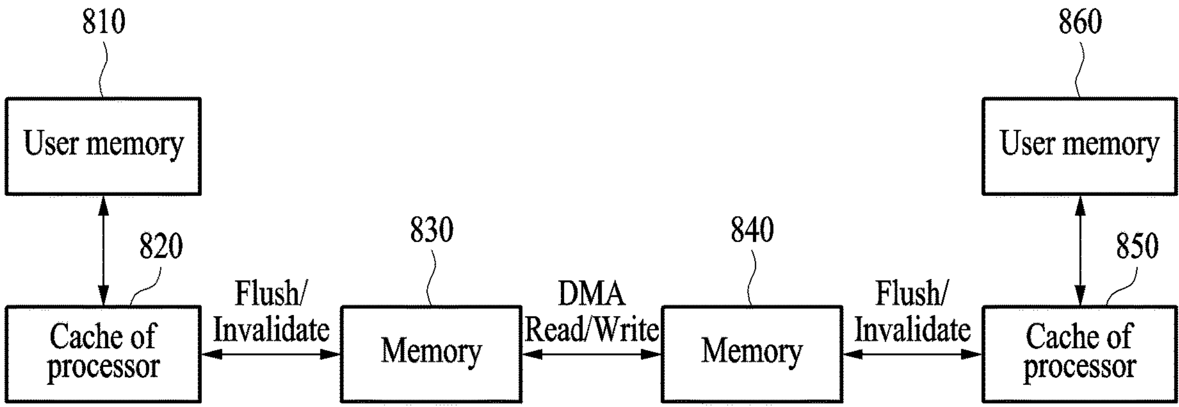
FIG. 8 shows an example of a PCIe-based data transmission method, according to one or more embodiments.

FIG. 8 shows an example of a PCIe-based data transmission method according to one or more embodiments.

Referring to FIG. 8, a user memory 810 and a memory 830 of a processor (or a PCIe controller) may exchange data through cache 820 (e.g., cache of an EP or cache of an RC) of a processor (e.g., a central processing unit (CPU) such as a host CPU). Since the data may be transmitted in the unit of cache operation, the data transmission efficiency may be improved. In addition, when the data of processor cache 850 is invalidated before copying the data of a processor memory 840 to the processor cache 850, the processor may correctly transmit the data of the processor memory 840 to a user memory 860. When flushing data in the cache 820 of a transmission end processor to the memory 840 of a reception end processor before transmitting data in the memory 830 of the transmission end processor to the memory 840 of the reception end processor, the data consistency in the cache 820 of the processor and the memory 830 of the processor may be ensured and through this, the reliability of data transmission may be ensured.

As described above, stable data transmission may be implemented and transmission performance may be improved by executing a program of a software stack through existing hardware (e.g., a processor and a DMA controller) rather than adding hardware to improve the data transmission performance.

The PCIe-based data transmission method according to one or more embodiments is described above with reference to FIGS. 1 to 8. Next, an EP and an RC according to another embodiment of the present disclosure are described with reference to FIGS. 9 and 10.

Figure 9:
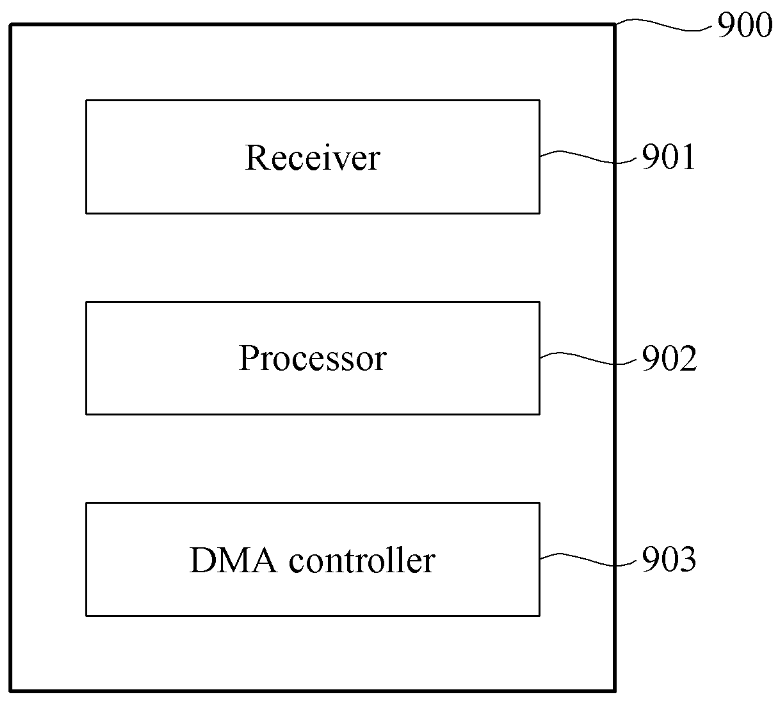
FIG. 9 shows structure of an endpoint, according to one or more embodiments.

FIG. 9 shows an example structure of an endpoint according to one or more embodiments.

Referring to FIG. 9, an EP 900 may include a receiver 901, a processor 902, and a DMA controller 903. The EP 900 may additionally include other components, and some of the components of the EP 900 may be separated, combined, or omitted.

For example, the receiver 901 may be configured to receive a doorbell (DB) message from an RC connected to an EP based on PCIe.

For example, the processor 902 may be configured to transmit a read request memory to a DMA controller of the EP by polling.

For example, in response to the reception of the read request message, the DMA controller 903 may be configured to read the data to be transmitted from the memory of the RC and record the read data in the memory of the EP 900.

For example, the processor 902 may be configured to stop the transmission of the read request message to the DMA controller when it is determined that the data to be transmitted no longer exists in the memory of the RC (i.e., there is no more data).

For example, when data read from the memory of the RC includes a data terminator, the processor 902 may be configured to determine that the data to be transmitted no longer exists in the memory of the RC.

For example, the processor 902 may operate in a cacheable mode, and in response to recording read data into the memory of the EP 900, the processor 902 may be configured to record the data read from the memory of the EP 900 in the first cache after invalidating data in the first cache of the processor. In response to the reception of a data transmission request, the processor 902 may be configured to record the data to be transmitted in a second cache of the processor and flush the data to be transmitted from the second cache to the memory of the EP 900.

For example, the DMA controller 903 may be configured to record the data to be transmitted from the memory of the EP to the memory of the RC.

For example, the processor 902 may also be configured to record a data terminator in the second cache of the processor of the EP 900 after recording the data to be transmitted in the second cache of the processor of the EP 900 and input the data terminator to the memory of the EP 900 from the second cache.

For example, the DMA controller 903 may be configured to read a data packet from the memory of the RC in a preset length.

For example, the processor 902 may determine whether the number of read data packets is an integer multiple of a predetermined number, and when the number of read data packets is the integer multiple of the predetermined number, the processor 902 may determine whether the preset length is greater than a length of a data packet having the greatest length among the predetermined number of recently read data packets. When the preset length is greater than the length of the data packet having the greatest length among the predetermined number of the recently read data packets, the processor 902 may update the preset length to the greatest length. In addition, when the number of read data packets is not an integer multiple of the predetermined value, the processor 902 may be configured to determine whether the length of the data packet is greater than the preset length based on the data of the read data packet. When it is determined that the length of the data packet is greater than the preset length, the processor 902 may be configured to update the preset length to the length of the data packet.

For example, when it is determined that the length of the data packet is greater than the preset length, the DMA controller 903 may be configured to read the data packet again at the length of the data packet.

Figure 10:
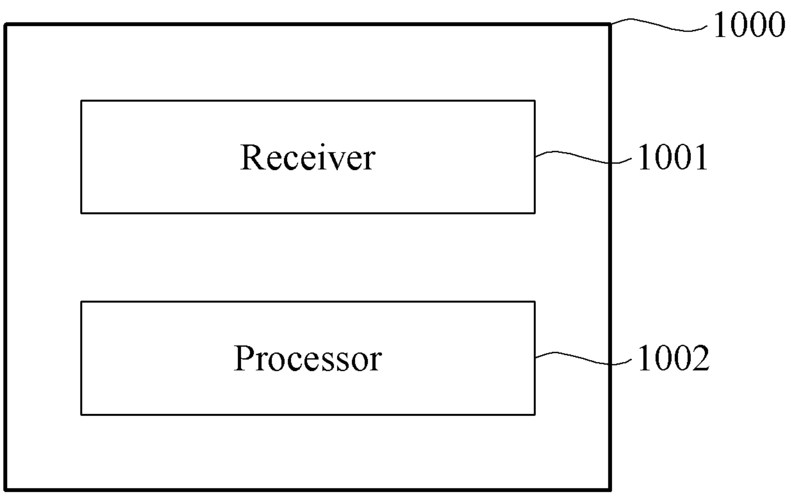
FIG. 10 shows structure of a root complex, according to one or more embodiments.

FIG. 10 shows example structure of a structure of a root complex according to one or more embodiments.

Referring to FIG. 10, an RC 1000 may include a receiver 1001 and a processor 1002, the RC 1000 may additionally include other components, and some of the components of the RC 1000 may be separated, combined, or omitted.

For example, the receiver 1001 may be configured to receive an MSI message transmitted by an EP.

For example, the processor 1002 may be configured to read data in a memory of an RC by performing polling. In this case, the data in the memory of the RC may be recorded by a DMA controller of the EP.

For example, when it is determined that data no longer exists in the memory of the RC, the processor 1002 may be configured to stop reading data by polling.

For example, the processor 1002 may operate in a cacheable mode, and in response to reading data in the memory of the RC 1000 by polling, the processor 1002 may be configured to record read data in a third cache after invalidating data in the third cache. In response to the reception of a data transmission request, the processor 1002 may be configured to record the data to be transmitted in a fourth cache of the processor 1002, flush the data to be transmitted from the fourth cache of the RC 1000 to the memory of the RC 1000, and transmit a doorbell (DB) message to the EP.

For example, the processor 1002 may also be configured to record a data terminator in the fourth cache of the RC 1000 after recording the data in the fourth cache of the RC 1000 and flush the data terminator from the fourth cache to the memory of the RC 1000.

For example, when a terminator is included in the data read from the memory of the RC 1000, the processor 1002 may be configured to determine that the data no longer exists in the memory of the RC 1000.

According to one or more embodiments, an electronic device may be provided and the electronic device may include a processor and a memory storing a computer program. In this case, when the computer program is executed by the processor, the PCIe-based data transmission method may be implemented.

According to one or more embodiments, a non-transitory computer-readable storage medium storing the computer program may be provided. In this case, when the computer program is executed by the processor, the processor may be prompted to execute the PCIe-based data transmission method.

The computing apparatuses, the electronic devices, the processors, the memories, the displays, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method with peripheral component interconnect express (PCIe) data transmission, the method comprising:

receiving, at an endpoint (EP), a doorbell (DB) message transmitted from a root complex (RC) via a PCIe connection between the endpoint (EP) and the RC;

based on the DB message, transmitting, by polling of a processor of the EP, a read request message to a direct memory access (DMA) controller of the EP; and in response to reception of the read request message by the DMA controller, reading, by the DMA controller, data to be transmitted from a memory of the RC and recording read data into a memory of the EP;

stopping the polling transmission of the read request message to the DMA controller by the EP processor responsive to there being no more of the data to be transmitted from the processor of the EP in the memory of the RC; and flushing, by the processor of the EP data to be transmitted from a second cache of the processor of the EP to the memory of the EP responsive to a data transmission request by the processor of the EP, wherein, the determining that there is no more of the data to be transmitted from the processor of the EP is based on the read data from the memory of the RC from the processor of the EP comprising a data terminator.

2. The method of claim 1, further comprising:

in response to recording the read data into the memory of the EP from the processor of the EP, recording the read data from the memory of the EP after invalidating data in a first cache of the processor of the EP, wherein the processor of the EP operates in a cacheable mode.

3. The method of claim 1, further comprising:

recording the data to be transmitted in the second cache responsive to reception of the data transmission request by the processor of the EP;

recording the data to be transmitted from the DMA controller from the memory of the EP to the memory of the RC, wherein the processor of the EP operates in a cacheable mode.

4. The method of claim 3, further comprising:

after recording the data to be transmitted from the processor of the EP into the second cache, recording a data terminator in the second cache; and inputting the data terminator from the processor of the EP from the second cache to the memory of the EP.

5. The method of claim 1, wherein the reading of the data to be transmitted from the memory of the RC and the recording of the read data in the memory of the EP comprises:

reading a data packet in the memory of the RC in a preset length from the DMA controller.

6. The method of claim 5, further comprising:

determining whether a number of data packets read from the processor of the EP is an integer multiple of a preset number;

when the number of data packets read from the processor of the EP is the integer multiple of the preset number, determining whether the preset length is greater than a length of a data packet having a greatest length among the preset number of data packets which are recently read; and when the preset length is determined that the preset length is greater than a length of the data packet having the greatest length among the preset number of data packets read from the processor the EP, updating the preset length to the greatest length.

7. The method of claim 5, further comprising:

determining whether a number of data packets read from the processor of the EP is an integer multiple of a preset number;

when a number of data packets read from the processor of the EP is not the integer multiple of the preset number, determining whether a length of the data packet is greater than the preset length based on data of the read data packet;

when the length of the data packet is determined that the length of the data packet is greater than the preset length in the processor of the EP, updating the preset length to the length of the data packet; and when the length of the data packet is determined that the length of the data packet is greater than the preset length in the DMA controller, reading the data packet again in the length of the data packet.

8. A non-transitory computer-readable storage medium storing instructions that, when executed by a processor, cause the processor to perform the method of claim 1.

9. A method of peripheral component interconnect express (PCIe) data transmission, the method comprising:

receiving a PCIe message signaled interrupts (MSI) message transmitted by an endpoint (EP) via a PCIe connection to a root complex (RC); and reading data in a memory of the RC from a processor of the RC by polling performed by the processor of the RC;

stopping polling that causes the reading the data responsive to determining that the data does not exist in the memory of the RC; and flushing the data to be transmitted from the processor of the RC from the fourth cache to the memory of the RC responsive to a data transmission request by the processor of the EP; and when a terminator is comprised in data read from the memory of the RC in the processor of the RC, determining that the data to be transmitted does not exist in the memory of the RC, wherein the data in the memory of the RC is recorded by a direct memory access (DMA) controller of the EP.

10. The method of claim 9, further comprising:

in response to reading data of the memory of the RC from the processor of the RC by the polling, recording read data in a third cache after invalidating data in the third cache of the processor of the RC, wherein the processor of the RC operates in a cacheable mode.

11. The method of claim 9, further comprising:

in response to reception of a data transmission request from the processor of the RC, recording data to be transmitted into a fourth cache of the processor of the RC;

and transmitting a doorbell (DB) message from the processor of the RC to the EP, wherein the processor of the RC operates in a cacheable mode.

12. The method of claim 11, further comprising:

after recording the data to be transmitted from the processor of the RC into the fourth cache, recording a data terminator in the fourth cache and flushing the data terminator from the fourth cache to the memory of the RC.

13. An endpoint (EP), comprising:

an interface configured to receive a doorbell (DB) message from a root complex (RC) connected to the EP based on peripheral component interconnect express (PCIe);

a processor configured to transmit a read request message to a direct memory access (DMA) controller of the EP by polling; and the DMA controller configured to read data to be transmitted from a memory of the RC in response to reception of the read request message, and record read data in a memory of the EP, wherein the processor is further configured to:

stop transmission of the read request message to the DMA controller responsive to determining that the data to be transmitted does not exist in the memory of the RC; and flushing data to be transmitted from a second cache of the processor of the EP to the memory of the EP responsive to a data transmission request by the processor of the EP, and wherein, the determining that there is no more of the data to be transmitted from the processor of the EP is based on the read data from the memory of the RO from the processor of the EP comprising a data terminator.

14. A root complex (RC) comprising:

an interface configured to receive a peripheral component interconnect express (PCIe) message signaled interrupts (MSI) message transmitted by an endpoint (EP) via a PCIe connection; and a processor configured to:

read data in a memory of the RC by polling;

stop the polling responsive to determining that the data does not exist in the memory of the RC; and flush data to be transmitted from a second cache of the processor of the EP to the memory of the EP responsive to a data transmission request by the processor of the EP, wherein, the determining that there is no more of the data to be transmitted from the processor of the EP is based on the read data from the memory of the RC from the processor of the EP comprising a data terminator, and wherein the data in the memory of the RC is recorded by a direct memory access (DMA) controller of the EP based on the polling.

* * * * *